United States Patent [19]

Rosenfield

[11] Patent Number: 5,579,636
[45] Date of Patent: Dec. 3, 1996

[54] PYROTECHNIC VALVE, IGNITER AND COMBUSTION PREHEATER FOR HYBRID ROCKET MOTORS

[75] Inventor: Gary C. Rosenfield, Las Vegas, Nev.

[73] Assignee: Aerotech, Inc., Las Vegas, Nev.

[21] Appl. No.: 407,866

[22] Filed: Mar. 21, 1995

[51] Int. Cl.$^6$ ............................................. F02K 9/72
[52] U.S. Cl. ................................. 60/251; 60/253
[58] Field of Search ........................... 60/250, 251, 252, 60/253, 254; 137/68.13

[56] References Cited

U.S. PATENT DOCUMENTS

| | | | |
|---|---|---|---|
| 2,736,459 | 2/1956 | Cockram et al. | 137/68.13 |
| 3,088,478 | 5/1963 | Schimmel | 137/68.13 |
| 4,075,832 | 2/1978 | Diesinger et al. | 60/250 |
| 4,424,679 | 1/1984 | Holzman | 60/251 |

*Primary Examiner*—Louis J. Casaregola
*Attorney, Agent, or Firm*—Richard R. Mybeck; Peter B. Scull

[57] ABSTRACT

A pyrotechnic valve, igniter and combustion preheater for hybrid rocket motors is described. Particularly, the present invention comprises a ported connection means in which is mounted a solid charge of pyrotechnic material which provides a barrier to and obstructs the flow ports of the connection means to maintain the physical separation of the fluid propellant from the solid propellant. In operation, the solid charge is ignited and burns which burning consumes the charge and thereby removes the barrier to fluid propellant flow. The preferred pyrotechnic charge also ignites the solid propellant and thereby initiates combustion. The ported connection means may also include a preheater chamber in which is disposed a hollow or slotted cylinder of solid fuel which when burned, reacts with and heats the fluid oxidizer as it flows to the main combustion chamber to increase the ignitability and combustion efficiency of the solid fuel grain disposed therewithin.

15 Claims, 1 Drawing Sheet

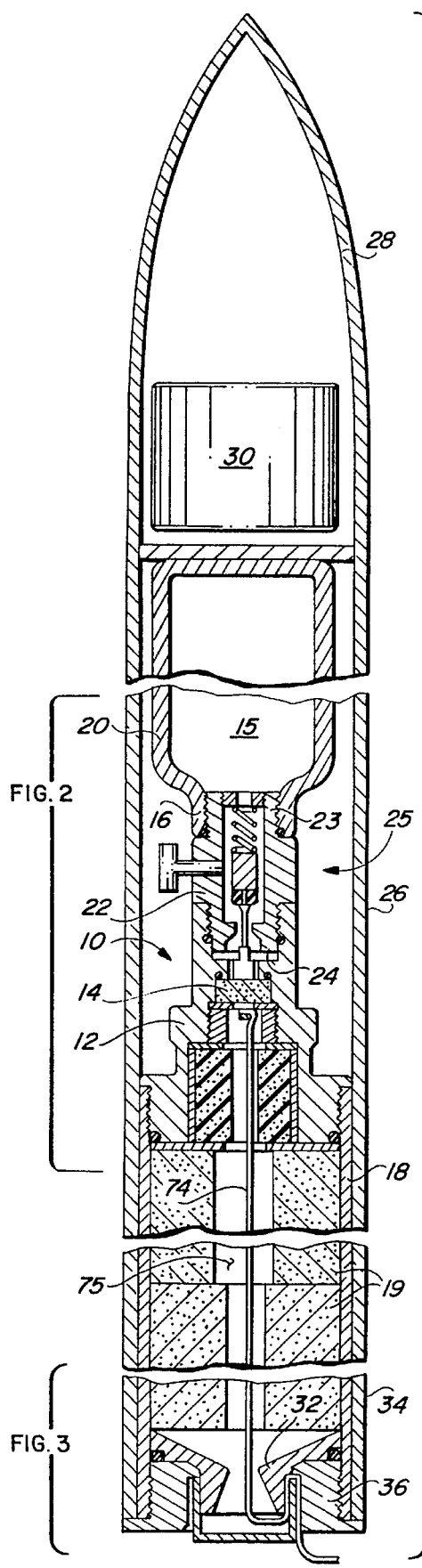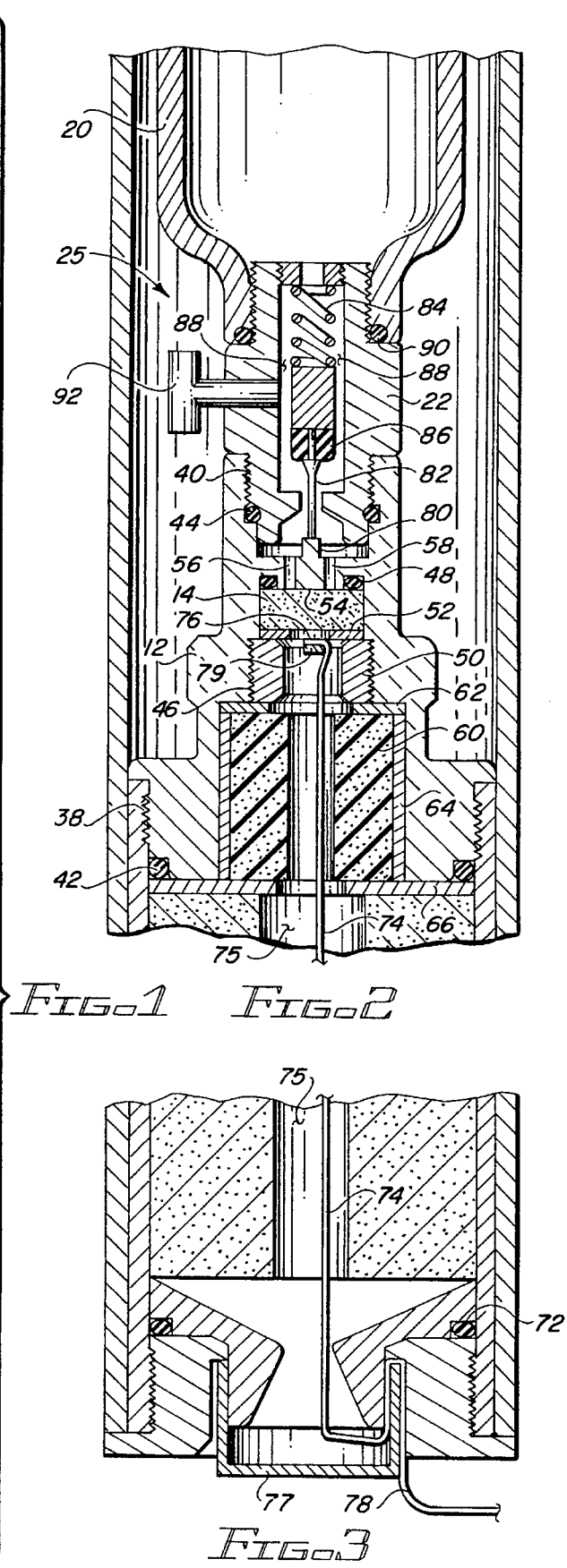

PYROTECHNIC VALVE, IGNITER AND COMBUSTION PREHEATER FOR HYBRID ROCKET MOTORS

INTRODUCTION

The present invention relates generally to hybrid rocket motors and more particularly to a new and improved hybrid rocket motor having a pyrotechnic barrier or valve and a combustion preheater. The pyrotechnic barrier or valve, when burned through, allows fluid propellant to flow to the main combustion chamber. This pyrotechnic valve can also function as the combustion igniter.

The present invention is useful in all hybrid rocket motors but may possess its greatest utility in consumer oriented rocketry. The unique coaction of components making this possible will be apparent from the following description.

BACKGROUND OF THE INVENTION

Hybrid rocket motors generally employ two or more initially separate propellants which usually exist in two different phases or physical states; namely, as a fluid propellant and a solid propellant. Preferably, fluid (liquid or gas) oxidizers are used with solid fuel grains, although, solid oxidizers have been used with fluid fuels in what are often referred to as "inverse hybrid rocket motors".

A barrier or valve is used to initially maintain the hybrid propellants in separate storage areas within the hybrid rocket. The fluid propellant is usually contained in a storage tank forward of the main combustion chamber in which the solid propellant grain is fixed. The fluid propellant tank is connected to the main combustion chamber by any of several known methods which, as will be discussed below, often involve valved tubes or pipes.

At start-up, the barrier (whether involving a valve or other means) separating the fluid propellant from the solid propellant is removed and thus, the fluid propellant is allowed to flow freely and usually with high velocity into the main combustion chamber where it combustively reacts with the solid fuel. This combustion generates high temperature, high pressure gases which exit the rocket nozzle and thereby create thrust. Note, depending on the types of oxidizers and fuels used, supplemental igniters and/or "preheaters" may also be necessary to initiate combustion. In other words, not all effective oxidizer-fuel combinations are hypergolically active (spontaneously ignitable upon contact).

Many different methods have been used in previous hybrid rockets to maintain an initial separation between the two propellants. These include, for example: Sessums (U.S. Pat. No. 3,142,152) who teaches a hybrid rocket motor having a non-pyrotechnically activated fluid flow valve located in an isolated compartment between the fluid and solid propellant compartments and further having a subsequent barrier provided by one or more spiraled melt away hoses embedded in the solid grain.

Strauss et al. (U.S. Pat. No. 3,177,657) teach the use of a pair of annular, burstable sealing bands as hybrid propellant barriers. A solid propellant igniter, when fired, causes a high pressure differential that bursts the first sealing band which initially separates the igniter from the liquid propellant. This igniter continues to create gases which pressurize the liquid propellant. When adequately pressurized, the liquid bursts a second annular band that initially separates the liquid from the solid propellant. The liquid is then forced into the combustion chamber where it reacts with the solid propellant to cause thrust.

Yet another pressure sensitive rupturable hybrid barrier is disclosed by Novotny (U.S. Pat. No. 3,325,998). Specifically, Novotny uses pressure sensitive rupture discs to seal the liquid propellant away from the solid propellant until it has been pressurized sufficiently to burst upon start-up.

The general art of rocketry has produced several pyrotechnically activated valve means such as that disclosed by Ferris (U.S. Pat. No. 3,431,731) which has an explosively actuated poppet valve means for rocket motors that involves a frangible diaphragm. Upon firing the poppet, the diaphragm is ruptured and a spring forces the valve closed.

Another explosively activated poppet-type valve means is taught by Hosek (U.S. Pat. No. 3,478,760) and involves the alternate opening or closing of the valve by the firing of opposing "squibs." Squibs are known in the art as comprising combustible materials having rapid burning characteristics which generate high pressure and/or high temperature gas.

The majority of prior art references involving fluid-solid separation means entail valves or other mechanisms used to control flow rate of fluid propellant to the combustion chamber thereby "throttling" the thrust. Examples of these include: Muzzy (U.S. Pat. No. 3,557,556) (Muzzy I) who teaches a hybrid rocket thrust modulator which is operated by a multiplicity of valves. During a low thrust cycle, a single valve feeds a liquid propellant to a single port in the center of the solid propellant grain. Other, radial ports in the solid propellant grain are fed by other valves to increase combustion during higher thrust cycles.

Another hybrid thrust control system is taught by Vickland (U.S. Pat. No. 3,677,011) who utilizes a plurality of solenoid valves in combination with spring forced poppet valves to control at least two fluid propellant flows.

Bennett (U.S. Pat. No. 3,714,783) discloses an inverse hybrid rocket which employs a non-pyrotechnic separation or barrier means involving an electrically controlled rack and pinion assembly.

What in some respects appears to be a combination of many of the above separation or barrier concepts is the hybrid rocket disclosed by Massie (U.S. Pat. No. 3,715,888) which uses a temperature sensitive disintegratable tube exhibiting a plurality of diameters to provide "throttling". This tube is embedded in the solid fuel grain to maintain separation of the fluid from the solid in a manner similar to that of Sessums as described above. Massie also discloses pressure sensitive rupture discs which retain the liquid in separation before start-up. Then, at start-up, the liquid is pressurized to rupture the discs and begin flow to the combustion chamber.

Stone (U.S. Pat. No. 3,789,610) also combines some of the above concepts in teaching an explosively actuated liquid oxidizer poppet valve which, when explosively fired to open, causes an upstream burst diaphragm to rupture and permit oxidizer flow to the combustion chamber. The hybrid liquid flow is terminated by firing an opposing explosive to close the oxidizer poppet.

Holzman (U.S. Pat. No. 4,424,679) involves yet another valve device for separating the fluid propellant from the solid propellant in a hybrid rocket. Holzman includes either the use of a bypass flow in combination with a solenoid valve, or a solenoid controlled valve which uses a spring forced poppet. A feedback transducer is used to control the desired orifice size of the solenoid valve.

Further, the prior art is replete with efforts to improve rocket motor ignition. Dual functions of igniters which must also act as pressure sensitive barrier means have been described. For example, MacDonald (U.S. Pat. No. 2,627,160) teaches an explosive charge igniter that is fixed in a solid propellant rocket nozzle and is employed to both rupture a nozzle closure element and also ignite the solid rocket propellant grain.

Similarly, Heady (U.S. Pat. No. 3,570,405) teaches an igniter charge bonded to an exit nozzle burst disc. Thus, when fired, this device not only ignites a solid propellant grain, it initiates the production of gases which elevates the interior pressure to eventually burst the disc and thereby allow propellant gas exit flow through the exit nozzle.

Burnside (U.S. Pat. No. 3,017,748) teaches the use of a black powder (or other pyrotechnic material) charge to ignite a hybrid rocket motor. At the head end of the combustion chamber, the igniter material is released upon ignition into the combustion chamber to ignite the solid propellant grain. A solid propellant layer, which seals perforations in a fluid propellant tank fixed in the combustion chamber, is then burned away to release the fluid propellant into the combustion chamber to then combust with the solid propellant.

Finally, certain hybrid propellant combinations require preheating of the oxidizer fluid before it enters the combustion chamber. Fluid fuels, such as propane have been burned in the presence of the oxidizer stream in, for example, Holzman (U.S. Pat. No. 4,424,679) and Knuth et al. (U.S. Pat. No. 5,010,730). Solid fuel preheaters have also been described, such as in Bradford (U.S. Pat. No. 3,518,828) who discloses a hybrid ignition system comprising a hollow cylinder of solid propellant contained in a structure apart from the main combustion chamber. This solid propellant cylinder produces fuel-rich, hot exhaust gases which flow into the ignition section of the main combustion chamber and there come into contact with oxidizer vapors flowing from the liquid oxidizer supply. These gases and vapors react to cause ignition of the solid rocket fuel in combination with the incoming liquid oxidizer.

Similarly, Muzzy (U.S. Pat. No. 3,782,112) (Muzzy II) discloses a hybrid rocket injector which gasifies and aerates a liquid oxidizer flowing to the combustion chamber. The injector has a hollow cylindrical gas generating portion of solid propellant between and separate from the main liquid and solid propellant storage chambers. This hollow portion of propellant is maintained in an annular chamber surrounding a tubular liquid oxidizer passageway running to the combustion chamber. This passageway has several openings therein which communicate with the annular chamber. In operation, the portion of propellant in the annular chamber is ignited and gives off hot gases which travel through the openings in the liquid oxidizer passageway and thereby vaporize and aerate the liquid oxidizer as it flows to the combustion chamber.

However, in spite of the many attempts as shown in the prior art, there still remains a need for a simple device which provides a structural barrier between the liquid and solid components of a hybrid rocket motor which is easily operable to remove the barrier from the fluid propellant flow path. A further benefit is realized from a hybrid propellant barrier which also functions as the means for ignition of the hybrid combustion reaction. Moreover, it would be preferable if the device housing the barrier would also provide a fluid oxidizer preheater to increase ignition and combustion efficiency. It is toward the resolution of these previously unfilled needs that the present invention is directed.

BRIEF SUMMARY OF THE INVENTION

The present invention relates generally to hybrid rocket motors and more particularly to a hybrid rocket motor including, in combination therewith, a device providing both a pyrotechnic barrier or valve which may also function as a rocket igniter. In its preferable practice, this device will be adapted to house a combustion preheater as well.

As described above, hybrid rocket motors have solid and fluid combustion components that must be kept separate prior to ignition. The present invention comprises a ported connection means interposed between the fluid storage tank and the main combustion chamber. The physical separation of the liquid component from the solid component is achieved by affixing a solid portion or charge of pyrotechnic material in the flow passageway defined by one or more ports in the connection means. In operation, the pyrotechnic material is fired by conventional means (such as by electric initiation) and burns. This burning consumes the solid pyrotechnic charge and converts it to hot gases which, incidentally, ignite the hybrid solid propellant and/or a preheater interposed between the barrier and the solid propellant grain. Thus, when the charge is consumed, there no longer exists a physical barrier restraining the flow of the liquid component through the connection means to the main combustion chamber. In other words, when the barrier is removed by the combustive consumption of the pyrotechnic charge, it may also be viewed as a valve that is now opened.

The ported connection means which provides the fluid oxidizer flow passageway also preferably comprises a chamber for containing a hollow cylinder of a solid propellant fuel material which acts as a combustion preheater. This solid fuel cylinder is ignited either simultaneously with or by the combustible barrier means and burns to generate hot gases which heat and react with the oxidizer fluid to make the oxidizer more readily ignitable upon contact with the solid propellant in the main combustion chamber.

Accordingly, the principal object of the present invention is to provide a hybrid rocket pyrotechnic barrier or valve which is simply removable by the combustive consumption of the valve.

Another object of the present invention is to provide a connection means for hybrid rockets which incorporates a pyrotechnic valve to separate the hybrid rocket liquid component from the solid component prior to ignition.

Yet another object of the present invention is to provide a hybrid rocket fluid oxidizer preheater which is simply disposed in or about the fluid oxidizer stream.

These and still further objects as shall hereinafter appear are readily fulfilled by the present invention in a remarkably unexpected fashion as will be readily discerned from the following detailed description of an exemplary embodiment thereof especially when read in conjunction with the accompanying drawing in which like parts bear like numerals throughout the several views.

BRIEF DESCRIPTION OF THE DRAWING

In the drawing:

FIG. 1 is a broken, cross-sectional view of a hybrid rocket motor embodying the present invention;

FIG. 2 is a fragmented, cross-sectional view of the area bracketed and identified as FIG. 2 in the hybrid rocket motor depicted in FIG. 1; and FIG. 3 is a fragmented, cross-sectional view of the area bracketed and identified as FIG. 3 in the hybrid rocket motor depicted in FIG. 1.

DESCRIPTION OF THE PREFERRED EMBODIMENT

The present invention relates generally to hybrid rocket motors and more particularly involves a means for initially maintaining the hybrid solid and fluid propellant components separate. This separation means is identified in the attached drawing by the general reference numeral 10.

Separation means 10 preferably comprises a connection means such as connection member 12 which houses a solid charge 14 of black powder or other readily self-combustible material. As described briefly above, connection member 12 is ported to allow oxidizer fluid 15 to flow therethrough. However, when charge 14 is fixed in place, it creates a barrier so that fluid flow is blocked until charge 14 is removed by being combustively consumed.

As shown in FIGS. 1 and 2, connection member 12 is used to join together the principal elements of the hybrid rocket motor. Specifically, connection member 12 connects a fluid oxidizer storage means 16 to a solid fuel housing 18. Fuel housing 18 contains solid fuel grain(s) 19.

Fluid storage means 16 comprises a tank 20 to which is attached a conventional valve means such as the pin valve assembly 22. Pin valve assembly 22 is attachable at each end, namely, first end 23 and second end 24 to tank 20 and connection member respectively.

These hybrid rocket motor elements, which in combination generally comprise a hybrid rocket motor 25, are also shown as operably loaded into a rocket 26. Rocket 26 is of a conventional type generally including a separate fore section 28 designed to carry a payload 30, and an aft section 34 where rocket nozzle 32 is located. Note, as shown, nozzle 32 is directly connected to solid fuel housing 18 by aft closure 36 and is thus simply removable from rocket 26 with housing 18 and the other connected components of rocket motor 25. Thus, as shown, motor 25 is of a reusable, reloadable type that can be separately recharged and reinserted in rocket 26 for subsequent uses. Nevertheless, the present invention is not limited to reloadable rockets. Rather, the critical elements of the present invention may be simply incorporated in single use rocket motors as well.

Referring now to FIG. 2, further details of the present invention are shown. Specifically, the focus of FIG. 2 is on connection member 12 and the other components of rocket motor 25 associated with connection member 12. Connection member 12 is shown preferably attached to solid fuel housing 18 and pin valve assembly 22 at threaded connections 38 and 40, respectively. O-rings 42 and 44 are used in a conventional manner to seal these connections.

Further, a externally-connection 46 and an O-ring 48 are used to hold and seal solid charge 14 in place. More specifically, a hollow, threaded Allen nut 50 is screwed into threaded connection 46 and bears on a back-up washer 52 to hold charge 14. Solid charge 14 is disposed in flush relationship to edge 54 of connection member 12 to block fluid flow through the inlet ports 56, 58 defined in connection member 12. A thin disc (not shown) of polytetrafluoroethylene, also known as TEFLON®, may be interposed between charge 14 and edge 54 to effectuate a better seal and prevent premature chemical reaction between the oxidizer and combustible pyrotechnic charge 14.

Connection member 12 further comprises a hollow, cylindrical oxidizer preheater 60 made of a solid propellant grain material. A forward insulating washer 62 and a cylindrical insulator 64 are also disposed in connection member 12 in operative relationship to preheater 60.

Immediately downstream of and intimately contacting the bottom edge of connection member 12 is insulating washer 66 which is interposed between connection member 12 and hollow solid fuel grain(s) 19. O-ring 72 is operatively interposed between nozzle 32 and aft closure 36 and bears against nozzle 32 as shown in FIG. 3. Multiple port nozzles are forseeably useful here but are not essential, thus, FIGS. 1 and 3 show only a single throat nozzle Ignition lead(s) 74 are shown as disposed in housing 18. Particularly, lead(s) 74 run from an upper end 76 at or near charge 14, down through the hollow central portion of connection member 12, through hollow main combustion chamber 75, defined by the central cylindrical hollow area within fuel grain(s) 19, and out nozzle 32. A conventional nozzle cap 77 holds lower portion 78 of lead(s) 74 in place as shown in FIGS. 1 and 3. Ultimately, lower portion 78 is connected to a conventional electrical source (not shown) that will create an electric current in lead(s) 74 sufficient to ignite charge 14. Note, upper end 76 may be connected directly to charge 14 and/or end 76 may have a certain amount of combustible material 79 attached thereto to enhance ignitability.

Further details of oxidizer storage means 16 and its interrelationship with the upstream end of connection member 12 are also shown in FIG. 2. In particular, the interior of a conventional pin valve assembly 22 is shown in operative relationship with both tank 20 and connection member 12. As shown, connection member 12 has integrally formed therein a pin valve depressor 80 which is shown holding pin 82 in depressed position against the action of spring 84. A sealing ring 86 is disposed about pin 82 and is used to restrain fluid flow through pin valve assembly 22 when pin 82 is not depressed. Flow orifices 88 are also shown as defined through a conventional pin valve assembly 22. O-ring 90 is operatively installed to seal the connection between pin valve assembly 22 and tank 20. Finally, pressure sensitive relief valve 92 is operatively installed to provide a safety release in the event that the internal pressure within tank 20 exceeds predetermined safe levels.

The manufacture of the present invention highlights one of its principal advantages; namely, the inexpensive availability of each of the components. For example, connection member 12 is simply formed from stock aluminum using well-known manufacturing techniques. Even simpler, tank 20 and pin valve assembly 22 are presently commercially available, the preferred models being manufactured for carbon dioxide ($CO_2$) use in the paintball gun industry. However, for use with the preferred oxidizer here, nitrous oxide ($N_2O$), these components must be cleaned and certified for oxygen ($O_2$) service pursuant to current Department of Transportation (DOT) regulations. This is also true for certain other elements used herein, namely, they need to be oxygen resistant. For example, conventional paintball pin valve assemblies use a polyurethane sealing ring 86 disposed around pin 82; however, polyurethane tends to deteriorate or ignite when exposed to the flow of liquid $N_2O$ which can cause flow disruption and jeopardize a rocket mission. Thus, in the preferred practice of the present invention, a polytetrafluoroethylene (TEFLON®) sealing ring 86 should be used. Oxidizer storage O-rings 44 and 90 are also preferably formed of non-oxidizable materials. However, since O-rings 44 and 90 are not directly subject to oxidizer flow, they may be made from standard elastomeric materials such as urethane or BUNA-S rubber and need not be made of TEFLON®. All other parts of oxidizer storage means 16 are preferably made of metals that are not susceptible to explosive or otherwise destructive deterioration during operation.

Similarly, the materials for the insulating members and O-rings disposed in connection member 12 and solid fuel housing 18 are chosen for their ability to withstand chemical and combustive deterioration but do not need to be TEFLON®. Thus, O-rings 42, 48 and 72 can preferably be made of standard elastomeric materials which are widely available and relatively inexpensive. Note, a highly fluorinated (high weight percent of fluorine with no hydrogen) non-oxidizable grease such as KRYTOX®, a perfluoropolyether (PFPE) (also called perfluoroalkylether (PFAE) or perfluoropolyalkylether (PFPAE)) can be used on all connections and O-rings to lubricate and seal these parts. KRYTOX® greases are used for applications requiring complete non-inflammability, oxygen compatibility ($O_2$ service) and resistance to aggressive chemicals and therefore are especially useful on and around sealing ring 86 which is directly subjected to the high pressure and high flow rate from oxidizer tank 20.

In the preferred embodiment, back-up washer 52 is aluminum, washer 62 is fiber and washer 66 is phenolic. Cylindrical insulator 64 (and a like optional cylinder about fuel grain(s) 19 (not shown)) are preferably formed of either an insulative cardboard, which may be treated with a phenolic resin or a vulcanized fiber.

Again, the remaining principal structural elements of the downstream rocket motor components are made from readily available sturdy materials. Preferably, these include lightweight, ductile, high strength, heat resistant metals such as magnesium, titanium or aluminum. One preferred embodiment employs the use of the ductile aluminum supplied by Alcoa as ALUMINUM 6061 for connection member 12, solid fuel housing 18 and aft closure 36. Allen fastener 50 is also preferably a sturdy metal such as alloy steel or the like and adapted to withstand the high temperatures and pressures associated with rocket motor ignition and combustion. Nozzle 32 may also be a sturdy metal or, in another embodiment, a frangible material to fracture if undesirably high internal pressures occur (such as in excess of 2000 psi). Such a frangible material may be a thermoset plastic, a graphite fibers, glass, or silica reinforced phenolic resin, or solid graphite.

Finally, as mentioned above, the preferred combustion components are also widely available and inexpensively obtainable. Oxidizer fluid 15 is preferably denatured nitrous oxide ($N_2O$ with a small amount of $SO_2$ added to prevent substance abuse) in liquid form which is stored in tank 20 and at room temperature, and is preferably charged to a pressure of 850–900 pounds per square inch (psi). Note, a small percentage of the $N_2O$ in tank 20 may convert to gas under these conditions, however, the great majority remains liquid. Solid fuel grain(s) 19 may then be composed of any of a variety of substances including but not limited to non-inert fuel-rich standard solid propellant grains (which would effectively be turbocharged by combination with the fluid oxidizer) and relatively inert materials such as rubber, plastics and carbohydrates (such as cellulose and paper). The preferred combination is a nitrous oxide oxidizer with a carbohydrate fuel to provide both safety (both are inert when segregated) and reduced expense (from approximately 1/6 to 1/4 the cost of single use solid propellants and 1/3 to 1/2 the cost of reloadable solids).

Preheater 60 is also relatively inexpensive because even though it is formed from conventional solid propellant materials and mixtures, a much smaller amount than that required for conventional solid fuel rockets is used in the present invention. Thus, a preferred preheater 60 is formed in conventional fashion on a much smaller scale to fit within connection member 12.

Rocket motor 25 is then assembled by first loading the necessary elements into connection member 12. The end to be attached to pin valve assembly 22 is positioned downwardly and then O-ring 48 is placed in position in connection member 12. A thin disc of an optional TEFLON® separator (not shown) may be placed over and cover O-ring 48 and ports 56, 58 to prevent reaction between pyrotechnic charge 14 and the nitrous oxide oxidizing fluid. Pyrotechnic charge 14 is then placed thereover whether or not the separator is used. Back-up washer 52 is then placed on charge 14 and Allen fastener 50 is screwed into place to force washer 52, charge 14 and the optional TEFLON® separator (when used) into fixed position so that the TEFLON® separator and/or charge 14 completely block ports 56 and 58. Sufficient force is applied by Allen fastener 50 to cause charge 14 and the TEFLON® separator to sufficiently bear against O-ring 48 causing it to slightly deform and create a seal sufficient to withstand the pressure to be applied thereto by the oxidizing fluid 15 in tank 20.

Next, insulative washer 62 and cylinder 64 are placed in their respective positions within connection member 12. Solid preheater 60 is then put in position and connection member 12 is ready to be attached to solid fuel housing 18. An empty housing 18 is thus screwed into place on connection member 12.

Note, a similar method is used to load the necessary elements into solid fuel housing 18 in that first, O-ring 42 is set in position in its slot, and then insulative washer 66 (and an optional fuel grain insulative cylinder (not shown)) are inserted into position in housing 18. Solid fuel grain(s) 19 are then inserted into housing 18 and are followed by a backup washer 70 and then a nozzle 32 and O-ring 72 which are forced into fixed position by aft closure 36. Aft closure 36 is torqued to present sufficient force to cause both O-rings 42 and 72 to create combustion resistant seals at their respective ends of housing 18.

The final step in the assembly of rocket motor 25 involves the filling and installation of oxidizer storage means 16. Tank 20, to which pin valve assembly 22 is preattached, is filled in a known manner with the preferred fluid oxidizer which is maintained at working pressure by pin valve assembly 22 coacting with tank 20. O-ring 90 and sealing ring 86 assist in maintaining the working pressure by providing a sufficient seal against the pressure of fluid 15. Note, excessive pressures in tank 20 are controlled by relief valve 92 which in one embodiment contains a pressure-sensitive diaphragm (not shown) which bursts at predetermined pressure differentials and thus allows a certain amount of fluid to escape from tank 20.

Oxidizer storage means 16 is then attached to the other components of rocket motor 25 at connection member 12 as is shown in FIGS. 1 and 2. Threaded second end 24 of pin valve assembly 22 is screwed into connection member 12 at connection point 40. In so doing, pin 82 of pin valve assembly 22 is depressed by pin depressor 80 of connection member 12. Fluid 15 is immediately allowed to flow into ports 56, 58 of connection member 12. However, flow is stopped at that point by pyrotechnic charge 14 in coaction with optional TEFLON® separator (not shown) and O-ring 48 as they bear against connection member 12. O-ring 44 is also preferably used to restrain the escape of fluid through connection 44. Thus, as pin valve assembly 22 is screwed into position in connection member 12, O-ring 44 is compressed between and bears against connection member 12 and pin valve assembly 22 to establish a seal therebetween.

Thus assembled, rocket motor 25 is now inserted into rocket 26. To do so, tank 20 of motor 25 is first inserted into and through aft portion 34 of rocket 26. The rest of the unified components of rocket motor 25 follow into rocket 26 until aft closure 36 meets the bottom edge of aft portion 34. Aft closure has an outside diameter which is larger than the diameter of rocket 26 and coacts therewith to prevent rocket motor 25 from advancing axially upwardly into rocket 26 during use. Axial egress of motor 25 from rocket 26 may be prevented in a number of conventional ways including, but not limited to, the use of one or more hooks (not shown) attached to rocket 26 which hook onto either motor housing 18 or aft closure 36.

Rocket 26 may then be mounted on a launch pad (not shown) in a conventional manner and fired by the application of electrical power by a method known in the art. Such a method may include wireless remote control ignition (not shown) of pyrotechnic charge 14 or simply may involve the application of electrical power to ignition leads 78. Again, upper end 76 of ignition leads 74 is preferably attached to pyrotechnic charge 14 and/or has an amount of combustible material 79 containing, for example, an oxidizer/fuel mixture of ammonium or potassium perchlorate, metal powder and a binder such as cellulose acetate, nitrocellulose, two-component epoxy or urethanes. The electrical power causes instantaneous combustion of combustible material 79 which then ignites pyrotechnic charge 14.

Pyrotechnic charge 14 then combusts or burns, and in so burning does two things. First, it gives off hot gases (and/or flames) which serve to ignite solid propellant grain(s) 19 and/or preheater 60 and second, over a short period of time, the burning of charge 14 physically consumes it. In the preferred embodiment, the period of time for consumption of all (or nearly all) of charge 14 is approximately one quarter of a second.

When charge 14 burns through (or is nearly burned through), the pressure of fluid 15 in storage means 16 overwhelms and breaks through the barrier once provided by charge 14 and the optional TEFLON® separator (the pressure differential between tank 20 and the interior of connection means 12 is preferably about 700–900 psi at ignition). Thus, fluid 15 blows through ports 56, 58 and then into and through connection means 12 and the cylindrical preheating chamber defined therein by the slot or central hollow area of preheater 60. As it flows through preheater 60, fluid 15 is heated by the hot gases given off by combusting preheater 60. This causes the fluid to break down into its constituent parts (in the preferred embodiment going from $N_2O$ to $N_2$ and $O_2$ at about 572° F.) and become gaseous. Fluid 15, now gaseous, proceeds into main combustion chamber 75 defined within solid fuel grain(s) 19. High temperature, gaseous fluid 15 then combustively reacts with solid fuel grain(s) 19 and creates a vast quantity of still further hot gases. These hot gases generate high pressures in main combustion chamber 75, blow off nozzle cap 77 and thus escape through nozzle 32. This flow through nozzle 32 consequently causes thrust which propels rocket 26 in the direction opposite the direction of gas flow through nozzle 32.

For any particular launch, depending on the preferred launch pattern, a plurality of sizes, shapes and materials of solid fuel 19 may be chosen for insertion in housing 18. However, the quantity of fluid oxidizer 15 is chosen to correspond as closely as possible with the quantity of solid fuel 19 disposed in housing 18 so that fluid oxidizer 15 can be completely combustively consumed. Thus, from the standpoint of flight efficiency it is preferable in practice to err on the side of having an excess of solid fuel 19 rather than to have an excess of oxidizer fluid 15.

From the foregoing, it is readily apparent that a new and useful embodiment of the present invention has been herein described and illustrated which fulfills all of the aforestated objects in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly what is claimed is:

1. In a hybrid rocket assembly having discrete storage areas for solid propellant and for fluid propellant, the improvement comprising connecting means for connecting the fluid propellant storage area to the solid propellant storage area said connecting means having a ported connection member which has one or more ports defined therethrough to provide direct communication between the fluid propellant storage area and the solid propellant storage area; and said connecting means further having a charge of pyrotechnic material securely disposed in said connection member to fully obstruct said direct communication between said fluid propellant storage area and said solid propellant storage area.

2. The improvement according to claim 1 further comprising an O-ring operatively interposed between said charge of pyrotechnic material and said ported connection member to prevent the premature flow of fluid propellant from said one or more ports.

3. The improvement according to claim 1 further comprising a polytetrafluoroethylene disc disposed in surface-to-surface engagement with the upper surface of said charge of pyrotechnic material in flow-obstructing relationship relative to said one or more ports.

4. The improvement according to claim 1 further comprising a hollow, externally-threaded Allen fastener mounted within said ported connection member adjacent said charge of pyrotechnic material to secure said charge within said ported connection member to block said one or more ports.

5. A means for operatively connecting a fluid propellant storage means to a solid propellant housing in a hybrid rocket comprising: a ported connection member having at least one port defined therethrough to provide direct communication between the fluid propellant storage means and the solid propellant housing; a charge of pyrotechnic material securely disposed in said connection member in blocking relationship to said at least one port; and a preheater composed of a cylinder of solid combustible material operatively disposed in said ported connection member between said charge of pyrotechnic material and said hybrid rocket solid propellant housing, said preheater having a longitudinally extending passage defined therethrough.

6. A means for operatively connecting according to claim 5 further comprising an O-ring operatively interposed between said charge of pyrotechnic material and said ported connection member to prevent the flow of fluid propellant from said at least one port.

7. A means for connecting according to claim 5 further comprising a polytetrafluoroethylene disc disposed in surface-to-surface engagement with the upper surface of said charge of pyrotechnic material in flow-obstructing relationship to said at least one port.

8. A means for connecting according to claim 5 further comprising a hollow, externally-threaded Allen fastener mounted within said ported connection member adjacent said charge of pyrotechnic material to secure said charge of pyrotechnic material within said ported connection member to block said at least one port.

9. A means for connecting according to claim 5 in which said longitudinally extending passage in said preheater is a hollow cylinder defined therethrough.

10. A means for connecting according to claim 5 in which said longitudinally extending passage in said preheater is a longitudinal slot defined therein.

11. A means for connecting a hybrid rocket fluid propellant storage area to a hybrid rocket solid propellant storage area comprising: a ported connection member having at least one port defined therethrough to provide direct communication between the fluid propellant storage area and the solid propellant storage area; a plug means disposed in said ported connection member; a preheater composed of a cylindrical portion of a solid propellant material, said preheater having a fluid flow passageway defined longitudinally therethrough, said preheater being operatively disposed in said ported connection member intermediate said plug means and said hybrid rocket solid propellant storage area.

12. A means for connecting according to claim 11 in which said plug means comprises a pyrotechnic charge of combustible material operatively interposed between said fluid propellant storage area and said solid propellant storage area to block said direct communication therebetween.

13. A means according to claim 12 further comprising an O-ring operably disposed intermediate said pyrotechnic charge of combustible material and said ported connection member.

14. A means according to claim 12 further comprising a polytetrafluoroethylene disc disposed in surface-to-surface engagement on said plug means intermediate said fluid propellant storage area and said pyrotechnic charge of combustible material.

15. A means for connecting according to claim 12 further comprising a hollow, externally-threaded Allen fastener operatively disposed adjacent said pyrotechnic charge of combustible material to secure said pyrotechnic charge of combustible material within said ported connection member.

* * * * *